May 24, 1938.  A. KURTI ET AL  2,118,090
GEAR SHIFTING AND LOCKING DEVICE
Filed April 4, 1936
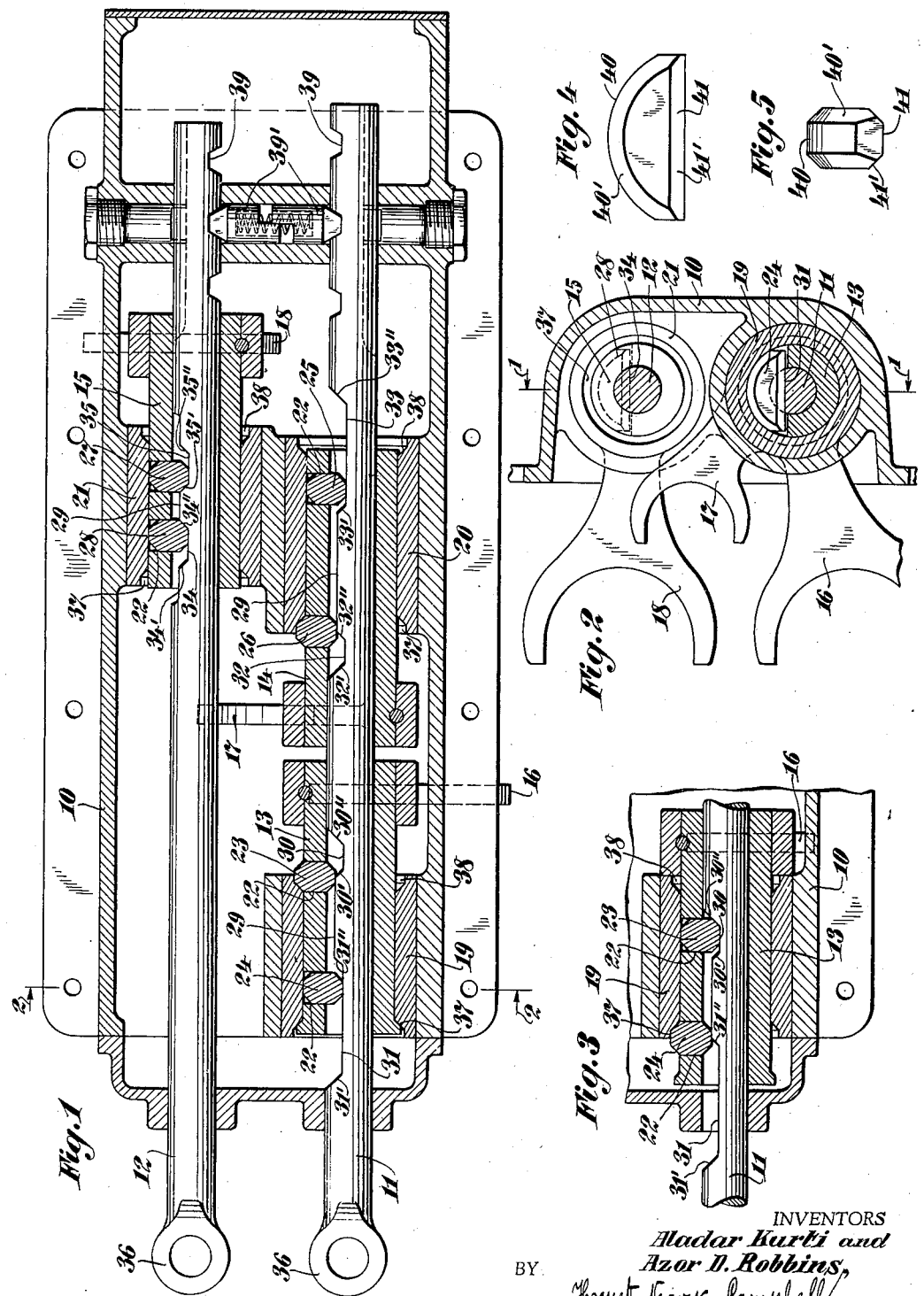
INVENTORS
*Aladar Kurti and
Azor D. Robbins,*
*Hoguet, Neary & Campbell*
THEIR ATTORNEYS Patented May 24, 1938

2,118,090

UNITED STATES PATENT OFFICE 2,118,090

GEAR SHIFTING AND LOCKING DEVICE

Aladar Kurti and Azor D. Robbins, Highland Park, N. J., assignors to International Motor Company, New York, N. Y., a corporation of Delaware Application April 4, 1936, Serial No. 72,732

14 Claims. (Cl. 74—475)

The present invention relates to gear shifting mechanisms and embodies, more particularly, an improved form of shifting mechanism wherein an effective locking device is provided by means of which the mechanism may be locked securely in a position to which it has been moved, wherein a desired gear connection is established.

In existing transmission mechanisms the gears are retained in a desired position by means of spring pressed detents which engage cooperating notches in the shifter shafts of the transmission mechanism, the mechanism thus maintaining the gears in a shifted position by reason of the spring and friction effect of the detent and notches. Not only does this mechanism add considerably to the force required to effect a gear shifting operation but it is obviously not positive in its locking functions. Moreover, in these existing forms of transmissions sufficient length must be provided in the mechanism to provide enough space between gears to allow the reverse gear to move when the low speed is engaged. Furthermore, when the reverse gear is engaged, space must be provided for extra travel of the low gear and the necessary added space in these existing mechanisms to prevent interference between the various elements and to provide for the proper operation thereof under all conditions adds considerably to the length of the gear case.

An object of the present invention, accordingly, is to provide a mechanism by means of which the gears are effectively locked in a desired position by a positive locking means.

A further object of the invention is to provide a gear shifting mechanism of such character as to enable a given number of shifting operations to be effected in a space which provides for a shorter gear case than in existing mechanism providing the equivalent gear connections.

A further object of the invention is to provide a gear shifting mechanism by means of which a plurality of gear shifting members are operated intermittently or independently by a common shifting means.

A further object of the invention is to provide a gear shifting mechanism, the elements of which may be effectively held in engaged position and which may be operated more easily than in existing devices.

Further objects of the invention will appear as it is described in greater detail in connection with the accompanying drawing, wherein Figure 1 is a view in horizontal section, taken through a gear shifting mechanism constructed in accordance with the present invention, the section line being illustrated by the line 1—1 of Figure 2;

Figure 2 is a view in section, taken on line 2—2 of Figure 1 and looking in the direction of the arrows; and Figure 3 is a partial view similar to Figure 1, showing the elements moved to another position.

With reference to the above drawing, a cover for a transmission mechanism is illustrated at 10 and is provided with shifter shafts 11 and 12. Sleeves 13 and 14 are slidably mounted upon the shaft 11 while a sleeve 15 is slidably mounted upon the shaft 12. The sleeves carry shifter forks 16, 17 and 18, respectively, which are adapted to engage and shift transmission gears of the usual type. Inasmuch as these gears constitute no part of the present invention, they are not shown in detail herein.

Bushings 19, 20 and 21 carry the respective sleeves 13, 14 and 15, these bushings being formed in the cover 10.

Each sleeve has two slots 22 cut through its side, the slots receiving keys 23 and 24 in sleeve 13; 25 and 26 in sleeve 14; and 27 and 28 in sleeve 15. The keys have a sliding fit in the slots and are formed with arcuate outer surfaces 40 to conform with the outer surface of the sleeves and the inner surface of the bushings. The inner surface 41 of the keys is flat to provide a surface which is adapted to slide on flat parts 29 which are formed on the shafts 11 and 12. Beveled portions 40' and 41' are formed on the inner and outer edges of the keys to facilitate actuation of the keys by cooperating surfaces on the respective shafts. Moreover, the keys are of sufficient depth to project through the slots and engage the hereinafter described notches of the shafts.

The shaft 11 is formed with notches 30 and 31 upon opposite sides of the flat portion 29 thereof. Notch 30 is formed with sloping sides 30' and 30", while notch 31 is formed with sloping sides 31' and 31". In corresponding manner, the shaft 11 is formed with notches 32 and 33 upon opposite sides of the flat portion 29 thereof which is adjacent the bushing 20. The sides of these notches slope as shown at 32', 32" and 33' and 33", respectively.

Shaft 12 is formed with notches 34 and 35 which are provided with sloping walls 34', 34", 35' and 35", respectively.

Each shaft is preferably formed with an eye 36 by means of which it may be moved and the bushings 19, 20 and 21 are formed with recesses 37 and 38 in the opposite ends thereof in order that the adjacent keys may be received therein as described hereinafter.

The shaft 11 may be moved outwardly until the shoulder 31'' engages the key 24. The shaft will then be in the position to permit the key 23 to fall into the notch 30 and further movement of the shaft will move the sleeve 13 and fork 16 until the fork reaches the end of bushing 19. At this point the key 24 has reached the end of the bushing opposite the recess 37 and is lifted out of the notch 31 and into the recess 37. The shaft may then be further moved to bring the adjacent end of the surface 29 beneath the key 24, as shown in Figure 3, thus locking the sleeve and fork in the desired position. Any tendency of the gear to disengage will be resisted by the key 24 engaging the end of the bushing.

To disengage the mechanism from the above position, the shaft 11 is moved inwardly until the shoulder 30' engages the key 23. Key 24 can now fall into the notch 31 and further inward movement of the shaft will carry the sleeve and fork with it until the shoulder 30' reaches the end of the bushing 19 to cause the key 23 to be lifted out of the notch 30. Further movement of the shaft brings the portion of the surface 29 adjacent the notch 30 under the key 23, thereby locking the sleeve in neutral position.

Fork 17 is connected to the reverse gear and is operated by means of the keys 25 and 26 inasmuch as inward movement of the shaft 11 will cause the shoulder 33' to engage the key 25. Key 26 then falls into the notch 32 and the sleeve 14 may be moved to engage or disengage the reverse gear in the same manner as described for the low gear. Notch 31 is cut sufficiently long to permit the operation of the reverse gear without affecting the sleeve 13, and notch 33 is also of sufficient length to avoid interference with key 25 when the shaft 11 is causing a low gear engagement.

It will thus be seen that, by the foregoing mechanism, intermittent and independent operation of the low speed fork 16 and reverse fork 17 is permitted from the common shifting shaft 11. This permits of a shorter gear case inasmuch as, in existing types of mechanisms, two forks are rigidly attached to a single shifter shaft and sufficient space must be provided between the gears to allow the reverse gear to move when the low gear is engaged. Moreover, when the reverse gear is engaged, space must be provided for extra travel of the low gear. In accordance with the construction described herein, the low and reverse gears move only the distance required to engage or disengage them and the length of the transmission is thereby decreased.

The shaft 12 operates the single fork 18 by means of which intermediate and high gears are obtained. In the neutral position, as shown in Figure 1, the slots of the sleeve 15 are both within the bushing and movement of the shaft 12 in either direction will move the sleeve inasmuch as shoulders 34'' and 35' will engage either of the keys 28 and 27, respectively. The length of bushing 21 is such that when the sleeve has traveled the required distance to engage a corresponding key 27 or 28 it will be lifted out of the respective notches 35 and 34 and engage the respective recesses 37 or 38, thus locking the gears in the manner described above.

In order that the shafts may be held in any desired position, notches 39 are formed therein, these notches being engaged by spring pressed plungers 39'. The strength of the spring which operates these plungers may be light inasmuch as any tendency of the gears to disengage is prevented by the keys and bushings, thus relieving these plungers from such stresses. As a result, the force required to shift the gears is greatly reduced over the force which has heretofore been required in existing mechanisms wherein these plungers serve as the means to hold the gears in a shifted position.

It will thus be seen that the foregoing mechanism provides a gear shifting device which is easily operated and in which the gears are positively locked in their engaged positions. Moreover, by providing the operating mechanism above described, the length of the transmission mechanism is greatly reduced because of the decrease in travel of the low and reverse gears. This also results in reducing the deflection of the gear shafts.

While the invention has been described with specific reference to the construction shown in the accompanying drawing, it is not to be limited, save as defined in the appended claims.

We claim:

1. A sleeve having a shifter fork thereon, a bushing in which the sleeve is slidably mounted, a shifter shaft slidable in the sleeve, keys in the sleeve, a flat surface on the shaft adapted to maintain the keys selectively in an extended locking position beyond the outer surface of the sleeve, and shouldered notches on either side of the flat surface to engage the respective keys and move the sleeve by the shaft.

2. A sleeve having a shifter fork thereon, a bushing in which the sleeve is slidably mounted, a shifter shaft slidable in the sleeve, keys in the sleeve, recesses in opposite ends of the bushing, a flat surface on the shaft to maintain the keys selectively in a locking position engaging the recesses, and shouldered notches on either side of the flat surface to engage the respective keys and move the sleeve by the shaft.

3. A sleeve having a shifter fork thereon, a bushing in which the sleeve is slidably mounted, a shifter shaft slidable in the sleeve, keys in the sleeve, a flat surface on the shaft adapted to maintain the keys selectively in an extended locking position beyond the outer surface of the sleeve, and shouldered notches on either side of the flat surface to engage the respective keys and move the sleeve by the shaft, one of said notches being elongated.

4. A transmission comprising a shifter shaft, spaced sleeves slidable on the shaft, stationary bushings in which the respective sleeves are slidably mounted, spaced slots in the sleeves, keys in the slots having a depth greater than the slots, and spaced notches in the shaft to engage the respective keys and actuate the respective sleeves by the shaft.

5. A transmission comprising a shifter shaft, spaced sleeves slidable on the shaft, stationary bushings in which the respective sleeves are slidably mounted, spaced slots in the sleeves, keys in the slots having a depth greater than the slots, spaced notches in the shaft to engage the respective keys and actuate the respective sleeves by the shaft and sloping shoulders on the said notches to move the respective keys outwardly to engage cooperating portions of the bushings and lock the respective sleeves against motion.

6. A transmission comprising a shifter shaft, spaced sleeves slidable on the shaft, stationary bushings in which the respective sleeves are slidably mounted, spaced slots in the sleeves, keys in the slots having a depth greater than the slots, spaced notches in the shaft to engage the respective keys and actuate the respective sleeves by the shafts, said notches being formed with sloping sides to move the respective keys outwardly to engage cooperating portions of the bushings and lock the respective sleeves against motion, and flat surfaces between certain of the notches to hold the keys in locking position.

7. A transmission comprising a shifter shaft, spaced sleeves slidable on the shaft, stationary bushings in which the respective sleeves are slidably mounted, spaced slots in the sleeves, keys in the slots having a depth greater than the slots, spaced notches in the shaft to engage the respective keys and actuate the respective sleeves by the shafts, said notches being formed with sloping sides to move the respective keys outwardly to engage cooperating portions of the bushings and lock the respective sleeves against motion, and flat surfaces between certain of the notches to hold the keys in locking position, certain of the notches being elongated.

8. A transmission comprising a shifter shaft, spaced sleeves slidable on the shaft, stationary bushings in which the respective sleeves are slidably mounted, spaced slots in the sleeves, keys in the slots having a depth greater than the slots, spaced notches in the shaft to engage the respective keys and actuate the respective sleeves by the shafts, said notches being formed with sloping sides to move the respective keys outwardly to engage cooperating portions of the bushings and lock the respective sleeves against motion, and flat surfaces between certain of the notches to hold the keys in locking position, one of the notches associated with each bushing being elongated.

9. A transmission comprising a shifter shaft, spaced sleeves slidable on the shaft, stationary bushings in which the respective sleeves are slidably mounted, spaced slots in the sleeves, keys in the slots having a depth greater than the slots, recesses in each end of each of the bushings, spaced notches in the shaft to engage the respective keys and actuate the respective sleeves by the shafts, said notches being formed with sloping sides to move the respective keys outwardly to engage the respective recesses in the bushings and lock the respective sleeves against motion, and flat surfaces between certain of the notches to hold the keys in locking position.

10. A transmission comprising a shifter shaft, spaced sleeves slidable on the shaft, stationary bushings in which the respective sleeves are slidably mounted, spaced slots in the sleeves, keys in the slots having a depth greater than the slots, recesses in each end of each of the bushings, spaced notches in the shaft to engage the respective keys and actuate the respective sleeves by the shafts, said notches being formed with sloping sides to move the respective keys outwardly to engage the respective recesses in the bushings and lock the respective sleeves against motion, and flat surfaces between certain of the notches to hold the keys in locking position, the remotely spaced notches being elongated to permit motion of one sleeve without interference by the other.

11. A transmission comprising a shifter shaft, spaced sleeves slidable on the shaft, stationary bushings in which the respective sleeves are slidably mounted, spaced slots in the sleeves, keys in the slots having a depth greater than the slots, recesses in each end of each of the bushings, spaced notches in the shaft to engage the respective keys and actuate the respective sleeves by the shafts, said notches being formed with sloping sides to move the respective keys outwardly to engage the respective recesses in the bushings and lock the respective sleeves against motion, and flat surfaces between certain of the notches to hold the keys in locking position, the remotely spaced notches being elongated to permit motion of one sleeve without interference by the other and yielding means to maintain the shaft in predetermined positions.

12. A transmission comprising a shifter shaft, spaced gear shifter means slidably mounted on the said shifter shaft in the transmission, means operated by the shifter shaft to actuate and lock the shifter means and means formed on the shifter shaft to operate the last named means selectively to lock one of the shifter means against movement when the other shifter means is being moved and to lock each of the shifter means in either of two positions.

13. A sleeve having a shifter fork thereon, a bushing in which the sleeve is slidably mounted, a shifter shaft slidable in the sleeve, a key in the sleeve to engage the bushing, sleeve and shaft, said key being formed with flat bearing surfaces, and means including the key to transmit motion between the shaft and sleeve, and to lock the sleeve in a desired position.

14. A transmission comprising a shifter shaft, a shifter fork on the shifter shaft operated by the said shifter shaft, a second shifter fork on the shifter shaft operated by the shifter shaft, means responsive to axial movement of the shaft for moving and then locking the first shifter fork, and means responsive to continued axial movement of the shaft for moving and then locking the second shifter fork.

ALADAR KURTI.
AZOR D. ROBBINS.